UNITED STATES PATENT OFFICE.

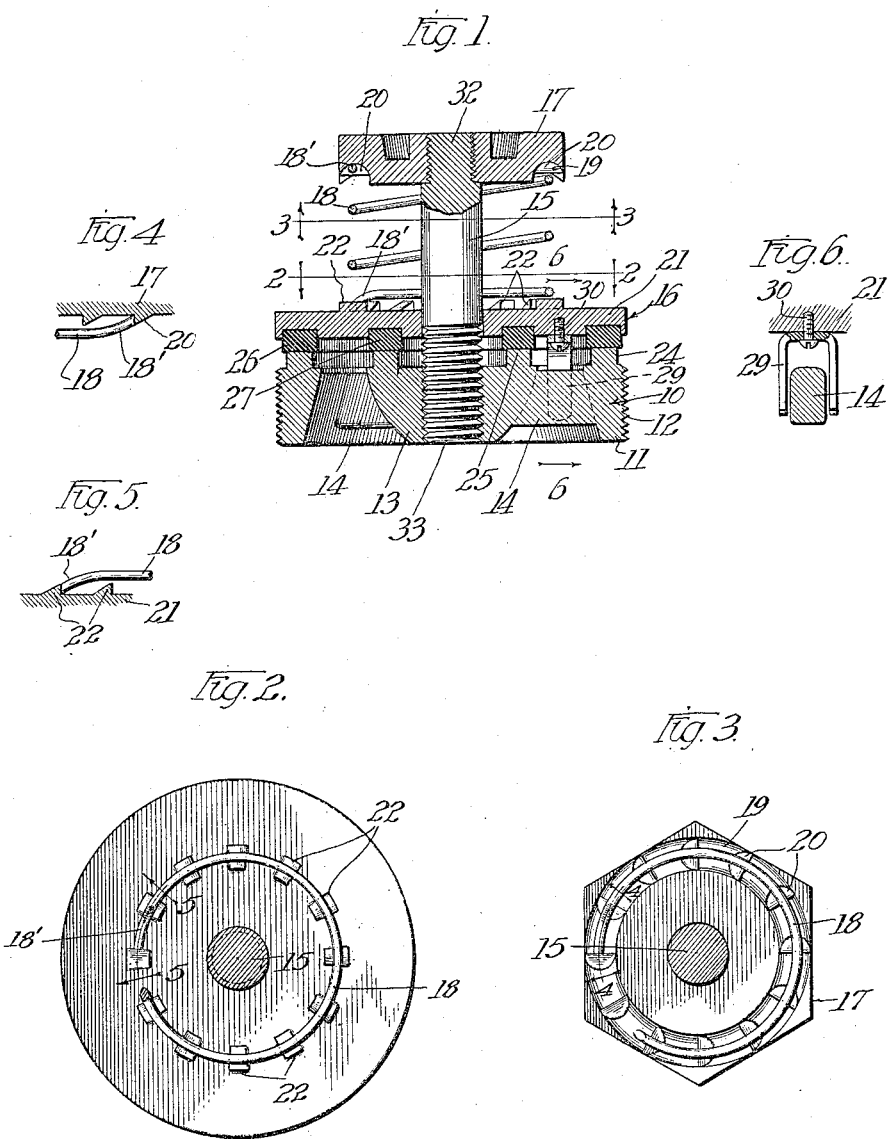

FREDRICK Y. NICHOLS, OF CHICAGO, ILLINOIS.

VALVE.

1,169,561.  Specification of Letters Patent.  Patented Jan. 25, 1916.

Application filed October 10, 1914. Serial No. 866,006.

*To all whom it may concern:*

Be it known that I, FREDRICK Y. NICHOLS, a citizen of the United States, residing at Chicago, in the county of Cook and State of Illinois, have invented certain new and useful Improvements in Valves, of which the following is a specification.

My invention relates to improvements in pump valves.

One of the objects of my invention is to provide an improved structure wherein the central guiding valve-stem or stud, may be easily removed from the valve body without the necessity of removing the body part from the deck or diaphragm of the pump into which it is adapted to be screwed and firmly held, and which stem, or nut on the upper end thereof, cannot be caused to work out of engagement or association with the valve body by jar or vibration incident to the use of the valve.

Other and further objects of my invention will become readily apparent to persons skilled in the art, from a consideration of the following description when taken in conjunction with the drawings, wherein—

Figure 1 is a central vertical section of my improved wire. Fig. 2 is a section taken on line 2—2 of Fig. 1. Fig. 3 is a section on line 3—3 of Fig. 1. Fig. 4 is a section on line 4—4 of Fig. 3. Fig. 5 is a section on line 5—5 of Fig 2. Fig. 6 is a section on line 6—6 of Fig. 1.

In all the views the same reference characters are employed to indicate similar parts.

The valve seat or body part 10 is screw threaded for insertion into a pump deck or diaphragm. This part is composed of the annular rim 11, screw threaded, as at 12, and an integral spider composed of a central hub 13 and radial arms or spokes 14. Threaded into the hub 13 is the central stud or stem 15 which projects vertically affording a guide for the valve 16 and carrying a head 17 upon its upper end for support of open helical coil spring 18. The head 17, which may be a separable nut, is provided with a peripheral groove 19, in its under surface, within which to contain the upper end of the spring 18. The groove 19 is provided with a series of downwardly projecting ratchet teeth 20, as more clearly shown in Fig. 4. The vertically movable valve plate 21 is also provided with a series of similar teeth 22, as more clearly shown in Fig. 5. Annular valve rings 26 and 27 are carried by the valve plate 21 for coöperation with the valve seats 24 and 25, respectively, of the structure 10.

It is desirable to prevent relative rotation of the plate 21 and of the valve body part 10, so as to preserve the relations existing between the surfaces of the valve rings 26 and 27 and the respective valve seats to maintain water tight contact therebetween. To prevent relative rotation of the parts I provide a strap 29, bent into U shape, as more clearly shown in Fig. 6, to overlie one of the spider arms 14 and secured to the plate 21 as by a screw 30. This means of preventing relative rotation of the valve parts will not produce undesirable cramping of the movable plate 21 on the stud 15.

The nut 17 may be screw threaded to the stud 15, as at 32, in which event the stud instead of being screw threaded into the valve body part 10, as at 33, may, if desired, be integral with said body part. Assuming that the screw threads at 32 and 33 are right handed, then the spring 18 should be wound left handed and the terminal ends of the spring should be down turned as at 18' to be in the notches between the teeth 20 and 22, respectively.

In screwing the nut 17 onto the stud 15 or in screwing the stud 15 into the body part 10, the ends 18' of the spring 18 will slide over the tapered teeth projecting from the part 17 and the part 21 just as a pawl will pass over the ratchet teeth of a wheel, but if effort be made to unscrew either the stud 15 from the body part 10, or the nut 17 from the stud 15, the ends 18' of the spring will engage the abrupt surface of the teeth 20 and 22 within the notches and prevent either of the instrumentalities from being unscrewed, unless one of the ends 18', either end of the spring, be raised so as to escape contact with the respective notches. Of course if the screw threads 32 and 33 be left handed, then the spring 18 should be wound in the reverse direction or right handed, so that the abrupt ends of the terminals 18' of the spring will always engage the abrupt edge of the notches or the teeth 20 and 22.

Having described my invention, what I claim as new with a view and desire to secure by Letters Patent is:—

1. In a valve, a fixed seat part; a coöperating valve part; means to prevent relative rotation of said parts; a spring yieldingly holding said valve seated; a screw-threaded spring-retaining means secured to the body part and means associated with the spring to prevent separation of the retaining means from the body part by relative rotation of said parts.

2. In a valve, a fixed seat part; a coöperating, non-rotatable valve part; an open coil spring, to yieldingly hold said valve closed; a central valve-guiding stud, having a screw threaded part to hold said spring in place, the direction of the thread and the coil of the spring being opposite and means on the respective parts to prevent rotation of the spring when the threaded part is turned in direction to cause disengagement of the threaded parts.

3. In a valve, a seat part; a coöperating valve part; means to prevent relative rotation of the parts; a central stud projecting from the body part; a head on the free end of said stud, said head or stud secured in place by screw threaded engagement; an open coil spring, having its convolutions coiled in direction opposite to the direction of said screw thread and having one end abutting against said valve and the other against said head and teeth arranged in the circumferential path of the ends, respectively, of said spring, on the head and on the valve, to engage the ends of said spring when the parts are rotated in direction to disengage the threaded members.

In testimony whereof I hereunto set my hand in the presence of two subscribing witnesses.

FREDRICK Y. NICHOLS.

In the presence of—
 STANLEY W. COOK,
 MARY G. ALLEN.

Copies of this patent may be obtained for five cents each, by addressing the "Commissioner of Patents, Washington, D. C."